(12) United States Patent
Liao et al.

(10) Patent No.: US 7,563,028 B2
(45) Date of Patent: Jul. 21, 2009

(54) SYNCHRONOUS SPACER WITH A GUIDING BLOCK

(75) Inventors: Chi-Meng Liao, Taichung (TW); Yun-Yi Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 379 days.

(21) Appl. No.: 11/536,804

(22) Filed: Sep. 29, 2006

(65) Prior Publication Data

US 2008/0080796 A1    Apr. 3, 2008

(51) Int. Cl.
*F16C 29/06* (2006.01)
*F16C 19/00* (2006.01)

(52) U.S. Cl. .......................... 384/45; 384/51
(58) Field of Classification Search .................. 384/45, 384/51, 520–522, 532, 43, 530
See application file for complete search history.

(56) References Cited

U.S. PATENT DOCUMENTS

| | | | |
|---|---|---|---|
| 6,155,718 A * | 12/2000 | Takamatsu et al. | 384/45 |
| 6,247,846 B1 * | 6/2001 | Shirai | 384/51 |
| 6,685,354 B2 * | 2/2004 | Michioka et al. | 384/45 |
| 6,733,179 B2 * | 5/2004 | Michioka et al. | 384/44 |
| 6,802,647 B2 * | 10/2004 | Hausberger et al. | 384/45 |
| 7,178,982 B2 * | 2/2007 | Chin-Pei et al. | 384/530 |
| 7,320,547 B2 * | 1/2008 | Kuo et al. | 384/45 |
| 2002/0090152 A1 * | 7/2002 | Shirai et al. | 384/45 |
| 2005/0036721 A1 * | 2/2005 | Wu et al. | 384/51 |
| 2006/0159373 A1 * | 7/2006 | Matsumoto | 384/45 |
| 2007/0110345 A1 * | 5/2007 | Hsu et al. | 384/45 |

FOREIGN PATENT DOCUMENTS

JP       2002310151 A  * 10/2002

* cited by examiner

*Primary Examiner*—Marcus Charles
(74) *Attorney, Agent, or Firm*—Banger Shia

(57) ABSTRACT

A synchronous spacer with a guiding block comprises strip-shaped links, a plurality of spacer elements, and a guiding block fixed at the end of the links. An arch-shaped surface is formed on the guiding block and is located correspondingly to inner surface of the track of the linear guideway, the guiding block is larger than spacer element of the synchronous spacer but is smaller than the rolling elements. With the guidance of the guiding block, the synchronous spacer is prevented from impacting the inner surface of the track, enabling the linear guideway to move smoothly and stably.

2 Claims, 6 Drawing Sheets

SYNCHRONOUS SPACER WITH A GUIDING BLOCK

BACKGROUND OF THE INVENTION

1. Field of the Invention

The present invention relates to a spacer for a linear guideway, and more particularly to a synchronous spacer with a guiding block, which prevents the occurrence of interference while improving the stability of the linear guideway.

2. Description of the Prior Art

Linear guideway is used more and more widely in modern industries. In addition to its high precision transmission performance, the linear guideway also has many other advantages, such as low friction loss, high ratio of energy conversion, low noise, high rigidity and wear-resistance. Therefore, it is self-evident that the linear guideway is very important to various industrial mechanisms. Normally, various linear guideways are provided with sliding bock, rail, and rolling elements that are used for linear and rotary application. However, to obtain the following objectives:

1, preventing the rolling elements from falling off the sliding block when taking the sliding block away from the rail;

2, preventing the rolling elements from touching one another, increasing the friction force thereof;

3, enabling the rolling elements to be arranged in an array, so that they can roll smoothly;

the current method is to put the rolling elements one by one into a chain of synchronous spacers, and the rolling elements are separated by the spacers.

One common method is shown in FIGS. 1 and 2, the synchronous spacer 10 includes a plurality of spacer elements 11 and a link 12. Each of the spacer elements 11 has two angular edge formed at both sides thereof. When the synchronous spacer 10 moves within the linear guideway, it will have the two following problems:

Firstly, when the synchronous spacer 10 moves from the circulating groove A of the loading area to the return portion B, since there are two spacer elements 11 and the link 12 at both ends of the synchronous spacer 10, plus each of the spacer elements 11 has two angular edges formed at both sides thereof, the spacer elements 11 will move linearly into the return portion B, impacting the inner surface B1 thereof, and then move along the inner surface B1 of the return portion (as shown in FIG. 1). Further, the spacer elements 11 and the link 12 at both ends of the synchronous spacer 10 will impact the connecting portion D (the assembly clearance) between the return portion B and the circulating groove A. Therefore, the synchronous spacer 10 cannot move smoothly into the return portion B.

Secondly, when the synchronous spacer 10 moves from the return portion B to the circulating groove A of the loading area, since there are two spacer elements 11 and the link 12 at both ends of the synchronous spacer 10, plus each of the spacer elements 11 has two angular edges, the spacer elements 11 will move into the circulating groove A in the tangent direction thereof, impacting the inner surface C of the circulating groove A, and then move linearly along the inner surface C (as shown in FIG. 2). Therefore, the synchronous spacer 10 cannot move smoothly into the return portion B, causing unstable motion of the rolling elements 13.

Thirdly, when the spacer 10 circulates within the linear guideway, the rolling elements 13 cannot move along the predetermined path due to the influence of impact and interference, and the rolling elements 13 will be subjected to many times of impact during movement, thereby seriously affecting the operation of the linear guideway.

To solve the abovementioned problems, another spacer structure was disclosed in U.S. Pat. No. 6,155,718, as shown in FIGS. 3 and 4, wherein the synchronous spacer 10 includes a plurality of spacer elements 11 and a link 12. The link 12 is formed at both ends 121 thereof with a curved guiding portion 122, and each of the spacer elements 11 is formed at either end thereof with a chamfer 111. This design can solve the abovementioned problems, however, it still has the following disadvantages:

Firstly, when the synchronous spacer 10 moves from the return portion to the circulating groove of the loading area, although the link 12 is formed with the curved guiding portion 122, and the spacer elements 11 are formed with chamfer 111, the connecting portion between the link 12 and the spacer elements 11 is still formed with vertical portion and angular edge, the spacer elements 11 cannot move into the circulating groove A smoothly in the tangent direction thereof, causing interference at the connecting portion (the assembly clearance) between the return portion and the circulating path.

Secondly, in addition to the fact that the vertical portion is formed at the connecting portion between the link 12 and the spacer elements 11, the spacer element 11 is smaller than the synchronous spacer 10, while the link 12 is larger than the synchronous spacer 10, therefore, the synchronous spacer 10 and the link 12 cannot guide the rolling elements 13 smoothly. The rolling elements 13 will deviate from the predetermined path and will be subjected to many times of impact during movement, thereby seriously affecting the operation of the linear guideway, and even causing noise.

The present invention has arisen to mitigate and/or obviate the afore-described disadvantages.

SUMMARY OF THE INVENTION

The primary objective of the present invention is to provide a synchronous spacer with a guiding block, which prevents the occurrence of interference while improving the stability of the linear guideway.

To achieve the abovementioned objective, the synchronous spacer with a guiding block comprises strip-shaped links and a guiding block fixed at the end thereof. The guiding block is formed with an arc-shaped surface for cooperating with the inner surface of the track of the linear guideway. With the guidance of the guiding block, the synchronous spacer is prevented from impacting the inner surface of the track, enabling the linear guideway to move smoothly and stably.

The secondary objective of the present invention is to provide a synchronous spacer with a guiding block capable of guiding the spacer along the predetermined path.

An arch-shaped surface is formed on the guiding block and is located correspondingly to inner surface of the track of the linear guideway, the guiding block is larger than spacer element of the synchronous spacer but is smaller than the rolling elements. The guiding block reduces the impact distance and forces the synchronous spacer to move along the predetermined route, thus effectively reducing the noise and the impact caused when the rolling elements circulate along the track.

DETAILED DESCRIPTION OF THE PREFERRED EMBODIMENTS

Figure 1:
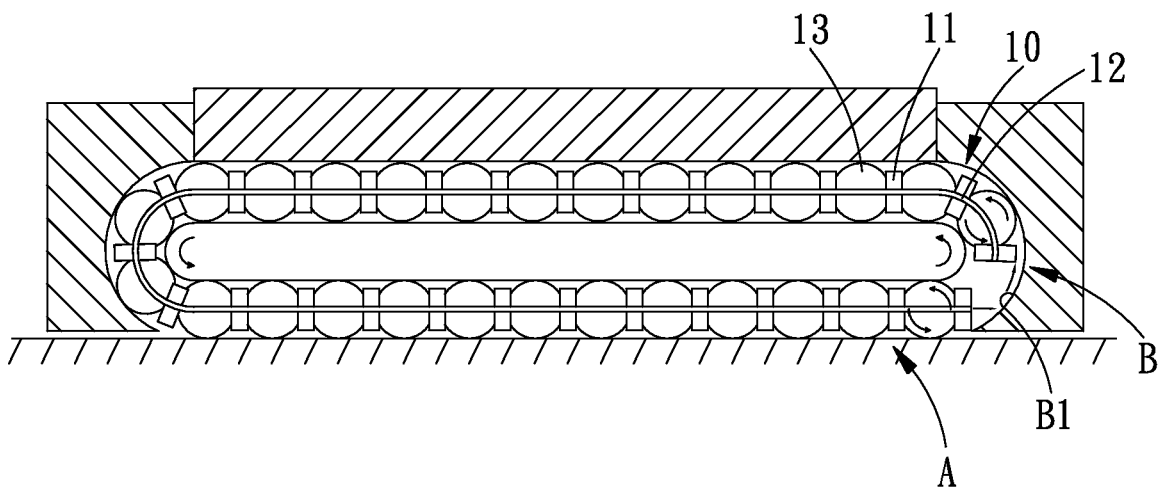
FIG. 1 shows that a conventional synchronous spacer is moving into the return portion.
Figure 2:
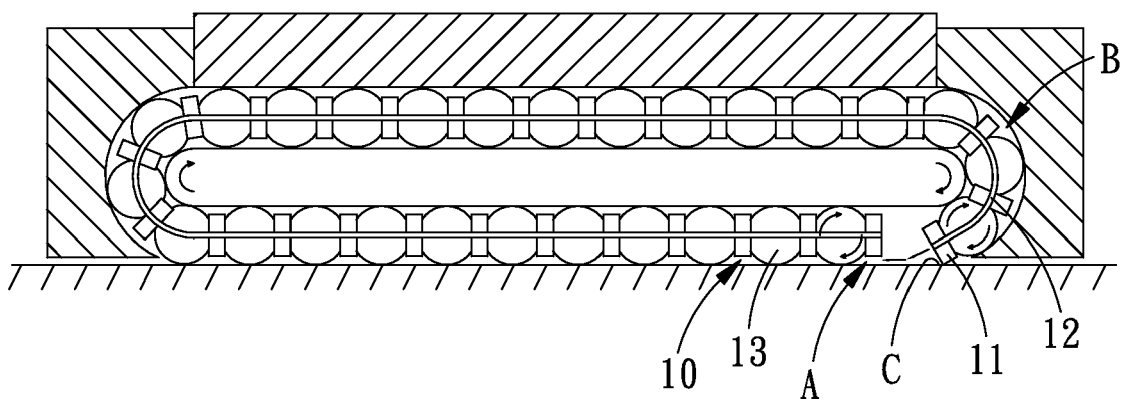
FIG. 2 shows that the conventional synchronous spacer is moving into the first rolling groove.
Figure 3:
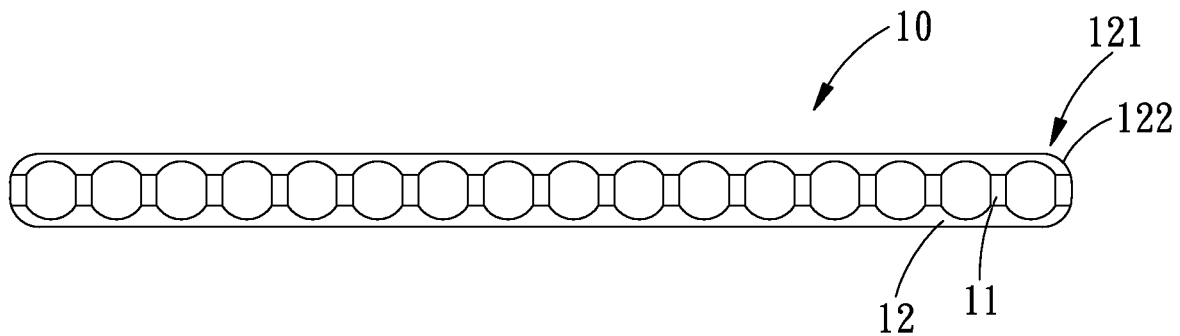
FIG. 3 is a side view of showing a conventional synchronous spacer.
Figure 4:
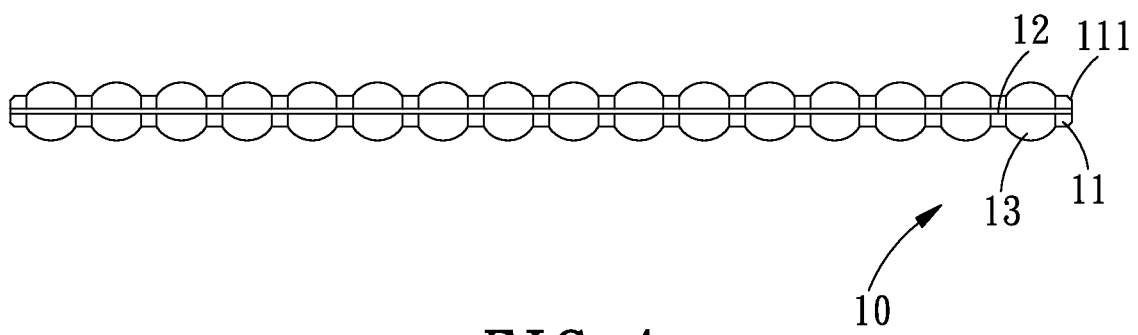
FIG. 4 is another side view of showing a conventional synchronous spacer.
Figure 5:
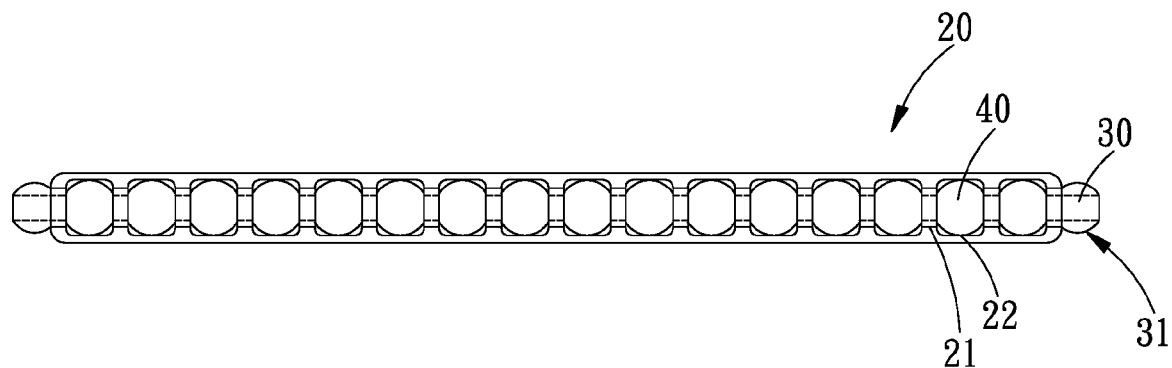
FIG. 5 is a side view of showing a synchronous spacer with a guiding block in accordance with the present invention.
Figure 6:
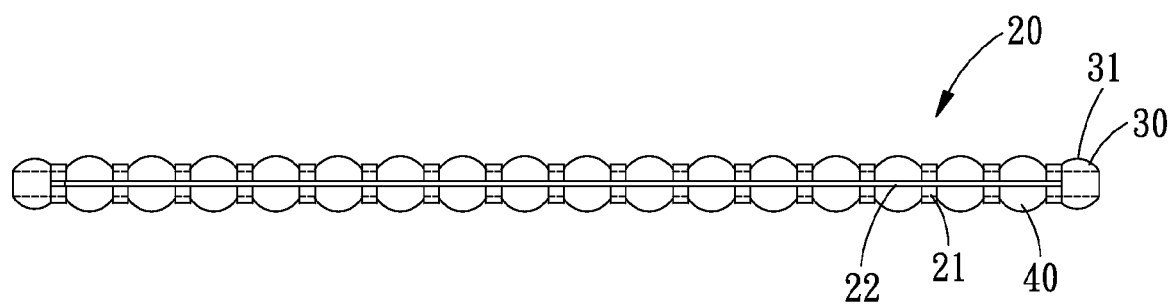
FIG. 6 is another side view of showing a synchronous spacer with a guiding block in accordance with the present invention.

The present invention will be more clear from the following description when viewed together with the accompanying drawings, which show, for purpose of illustrations only, the preferred embodiment in accordance with the present invention.

Referring to FIGS. 5-8, a synchronous spacer 20 with guiding blocks in accordance with the present invention at least comprises: a plurality of spacer elements 21, two strip-shaped links 22, and two guiding blocks 30. A plurality of rolling elements 40 is formed in the rack 51 of a linear guideway 50. The linear guideway 50 includes a rail 52, a sliding block 53 and two end caps 54 (linear guideway 50 is of a conventional design, so further explanation is omitted).

The synchronous spacer 20 is strip-shaped and includes a plurality of spacer elements 21 and two strip-shaped links 22 disposed at both sides of the plurality of spacer elements 21. The spacer elements 21 are maintained between the rolling elements 40. The synchronous spacer 20 moves together with the rolling elements 40 to circulate within the track 51 of the linear guideway 50.

Figure 9A:
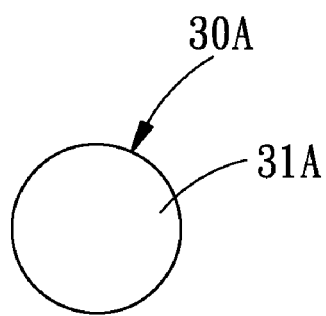
FIG. 9A shows a spherical-shaped guiding block 30A with an arc-shaped surface 31A.
Figure 9B:
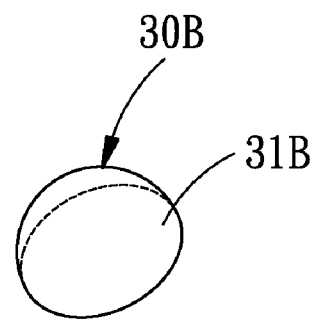
FIG. 9B shows a hemispherical-shaped guiding block 30B with an arc-shaped surface 31B.
Figure 9C:
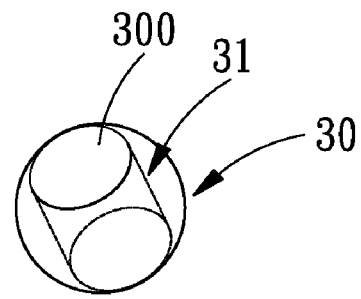
FIG. 9C shows a truncated spherical-shaped guiding block 30 with an arc-shaped surface 31.
Figure 9D:
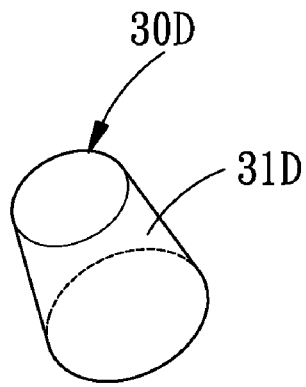
FIG. 9D shows a truncated conical-shaped guiding block 30D with an arc-shaped surface 31D.
Figure 9E:
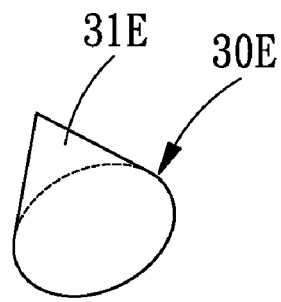
FIG. 9E shows a conical-shaped guiding block 30E with an arc-shaped surface 31E.
Figure 9F:
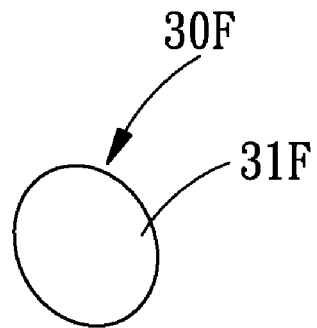
FIG. 9F shows an elliptical-shaped guiding block 30F with an arc-shaped surface 31F.
Figure 9G:
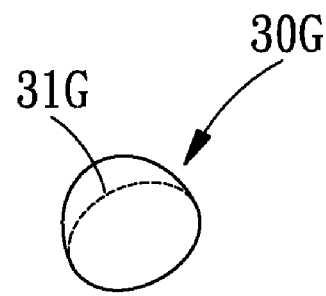
FIG. 9G shows a hemielliptical-shaped guiding block 30G with an arc-shaped surface 31G.
Figure 9H:
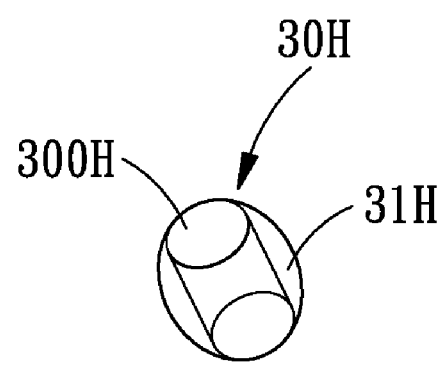
FIG. 9H shows a truncated hemielliptical-shaped guiding block 30H with an arc-shaped surface 31H.

Each of the guiding blocks 30 is directly fixed at the outer side of the spacer element 21 at either end of the synchronous spacer 20 without using the strip-shaped links 22 (the guiding blocks 30 in this embodiment are formed by integral ejection molding, so there is a die hole 300 and 300H in the center of some of the guiding blocks 30 and 30H as shown in FIGS. 9C and 9H), in other words, the strip-shaped links 22 is only disposed at both sides of the spacer elements 21 but not connected to the guiding blocks 30. A smooth arc-shaped surface 31 is formed on each of the guiding blocks 30 and is located correspondingly to the surface of the rack 51 of the linear guideway 50. The guiding block 30 is larger than the spacer element 21 of the synchronous spacer 20 but is smaller than the rolling element 40.

For a better understanding of the function of the present invention, reference should be made to the following detailed description.

The present invention comprises a rail 52, a sliding block 53, two end caps 54, a plurality of rolling elements 40, a synchronous spacer 20, and two guiding blocks 30. The rail 52 is axially formed with a first rolling groove 521 for enabling the rolling elements 40 to roll therein. The sliding block 53 is moveably mounted on the rail 52 and is axially formed with a second rolling groove 531 for the rolling elements 40. The second rolling groove 531 and the first rolling groove 531 cooperate with each other to form a load circulating groove 511. The sliding block 53 is further formed with a non-load circulating groove 512. The end caps 54 are disposed at both ends of the sliding block 53 and each is formed with a return portion 541 that cooperates with the load circulating groove 511 and the non-load circulating groove 512 to form a complete circulating path.

When in use, the synchronous spacer 20 and the rolling elements 40 circulate in the track 51 of the linear guideway 50. Each of the guiding blocks 30 is fixed at the outer side of the spacer element 21 at either end of the synchronous spacer 20. A smooth arc-shaped surface 31 is formed on each of the guiding blocks 30 and is located correspondingly to the surface of the rack 51 of the linear guideway 50. Therefore, the rolling elements 40 can be guided smoothly to the load circulating groove 511 or the non-load circulating groove 512 by the guiding blocks 30. And the smooth arc-shaped surface 31 of the guiding blocks 30 will slide along the inner surface of the track 51 of the linear guideway 50 without the problem of the angular-edge caused interference, thus ensuring the stable operation of the linear guideway.

It is to be noted that the guiding block 30 is larger than the spacer element 21 but is smaller than the rolling element 40, plus the guiding block 30 is integral with the spacer elements 21 of the synchronous spacer 20. Therefore, when the synchronous spacer of the present invention circulates within the track 51, although there is a great tangent difference between the return portion 541 of the end cap 54 and the load circulating groove 511, the smooth arc-shaped surface 31 can enable the guiding blocks 30 to smoothly slide over the assembly clearances and the corners of the linear guideway. Further, the guiding blocks 30 reduce the impact distance between the rolling element 40 at the rear of the guiding block 30 and the inner surface of the track 51, thus reducing the impact caused noise. Therefore, the size of the guiding blocks 30 being larger than the spacer element 21 and smaller than the rolling element 40 can force the synchronous spacer 20 to move along the predetermined route, and can prevent a large impact distance from being caused by the fact that the spacer elements at both ends of the conventional synchronous spacer are too small, thus effectively reducing the noise and the impact caused when the rolling elements circulate along the track.

Figure 7:
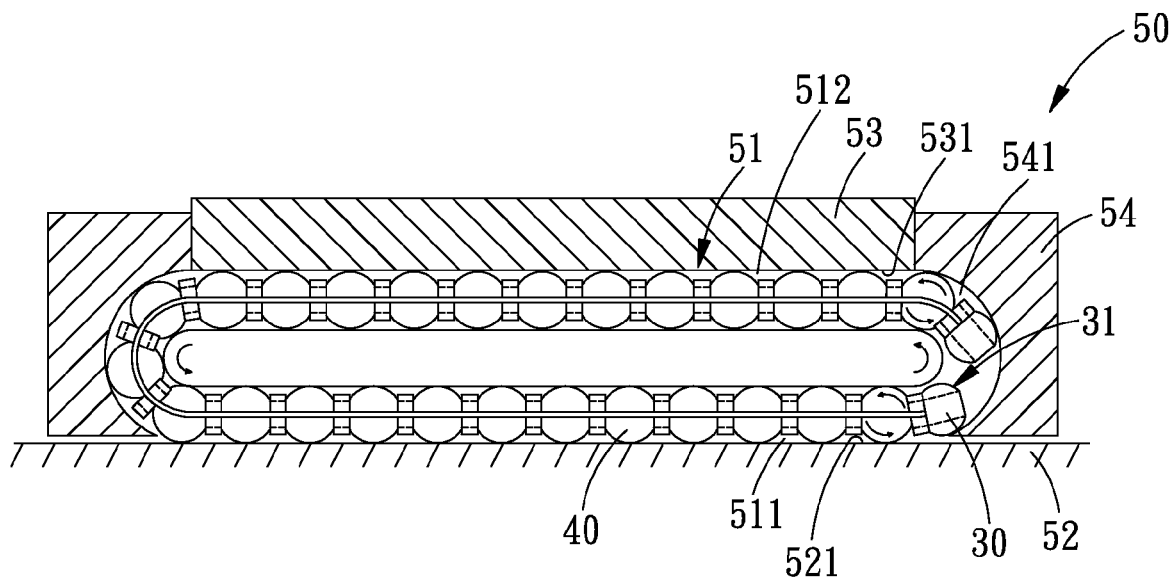
FIG. 7 is an illustrative view in accordance with the present invention of showing that the synchronous spacer is moving into the return portion.

Finally, the operation of the present invention is explained as follows:

As shown in FIG. 7, when the synchronous spacer moves form the load circulating groove 511 to the return portion 541, the guiding blocks 30 are disposed at both ends of the synchronous spacer 20, the smooth arc-shaped surface 31 will guide the synchronous spacer 20 smoothly into the return portion 541, preventing the spacer elements 21 of the synchronous spacer 20 from impacting the returning portion 541.

Figure 8:
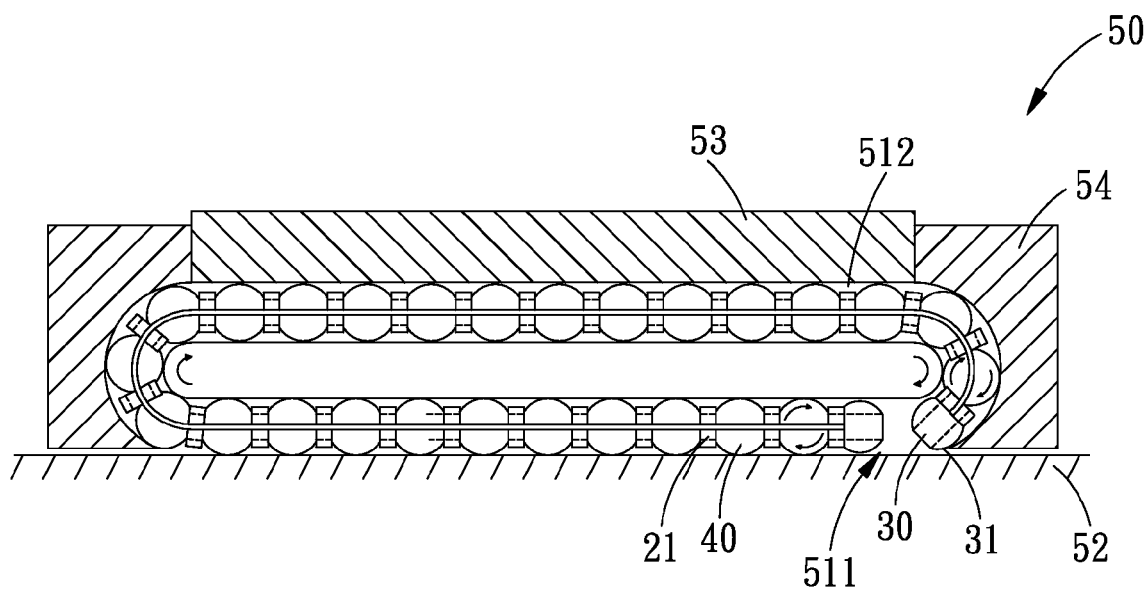
FIG. 8 is an illustrative view in accordance with the present invention of showing that the synchronous spacer is moving into the first rolling groove.

As shown in FIG. 8, when the synchronous spacer moves from the return portion 541 to the load circulating groove 511, the guiding blocks 30 are disposed at both ends of the synchronous spacer 20, the smooth arc-shaped surface 31 will guide the synchronous spacer 20 smoothly into the load circulating groove 511, preventing the spacer elements 21 of the synchronous spacer 20 from impacting the load circulating groove 511.

Referring to FIGS. 9a-9J, which show different embodiments of the guiding block 30, the embodiments include spherical-shaped guiding block 30A, hemispherical-shaped guiding block 30B, truncated spherical-shaped guiding block 30, truncated conical-shaped guiding block 30D, conical-shaped guiding block 30E, elliptical-shaped guiding block 30F, hemielliptical-shaped guiding block 30G, truncated hemielliptical-shaped guiding block 30H and their surfaces are designated by references numbers 31A, 31B, 31, 31D, 31E, 31F, 30G and 30H, respectively. The maximum diameter of the guiding block 30 is slightly smaller than the diameter of the rolling elements but is slightly larger than the spacer elements 21 of the synchronous spacer 20. The guiding blocks 30 in the aforementioned embodiments are made by ejection molding, and are formed with a central die hole.

To summarize, the synchronous spacer with a guiding block in accordance with the present invention comprises strip-shaped links, a plurality of spacer elements, and a guiding block fixed at the end of the links. An arch-shaped surface is formed on the guiding block and is located correspondingly to inner surface of the track of the linear guideway, the guiding block is larger than spacer element of the synchronous spacer but is smaller than the rolling elements. With the guidance of the guiding block, the synchronous spacer is prevented from impacting the inner surface of the track, enabling the linear guideway to move smoothly and stably.

While we have shown and described various embodiments in accordance with the present invention, it is clear to those skilled in the art that further embodiments may be made without departing from the scope of the present invention.

What is claimed is:

1. A synchronous spacer with a guiding block being strip-shaped and disposed in a track of a linear guideway together with a plurality of rolling elements, characterized in that:
    at least one guiding block is fixed at an end of the synchronous spacer, an arch-shaped surface is formed on the guiding block and is located correspondingly to inner surface of the track of the linear guideway, the guiding block is larger than spacer element of the synchronous spacer but is smaller than the rolling elements;
    wherein a shape of the guiding block is selected from the group consisting of spherical-shape, hemispherical-shape, truncated spherical-shape, truncated conical-shape, conical-shape, elliptical-shape, hemielliptical-shaped, or truncated hemielliptical-shape;
    the synchronous spacer includes a plurality of spacer elements and two strip-shaped links disposed at both sides of the plurality of spacer elements, the spacer elements are maintained between the rolling elements, the guiding blocks is fixed at an outer side of the spacer element at either end of the synchronous spacer, the guiding block is directly fixed to the spacer element located at one end of the synchronous spacer, and the links are not connected to the guiding block.

2. The synchronous spacer with a guiding block as claimed in claim 1, wherein the guiding block is formed with a central die hole.

* * * * *